July 10, 1956
H. FRIEDMAN
2,754,056
PULSE RATE COUNTER
Filed Feb. 14, 1951
2 Sheets-Sheet 1
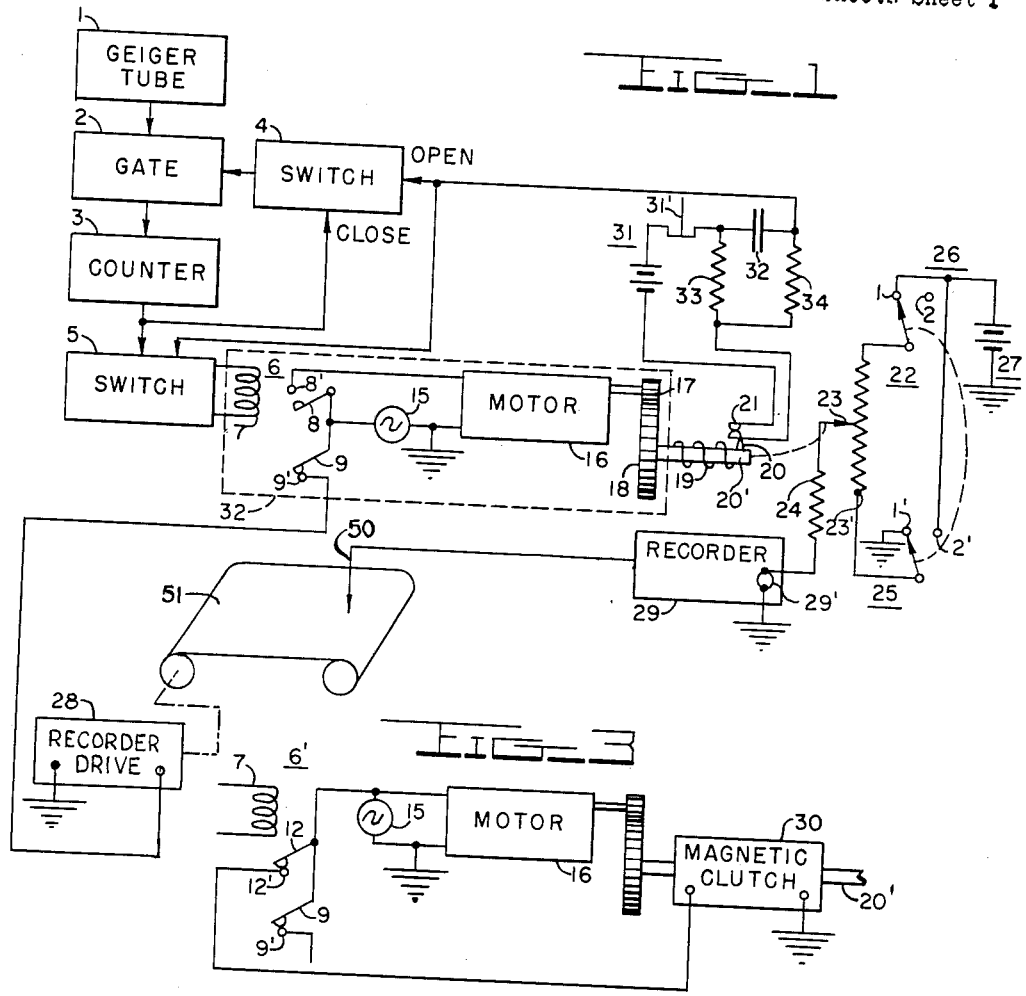
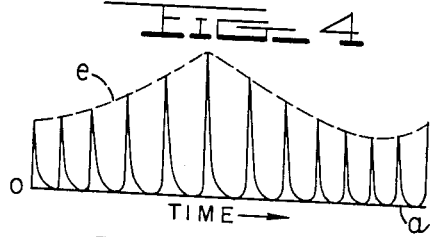
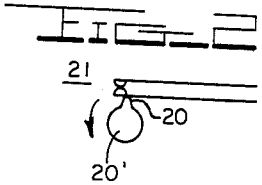
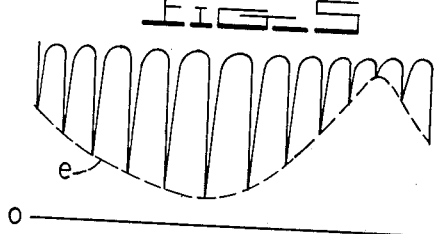
INVENTOR
HERBERT FRIEDMAN
BY
ATTORNEYS

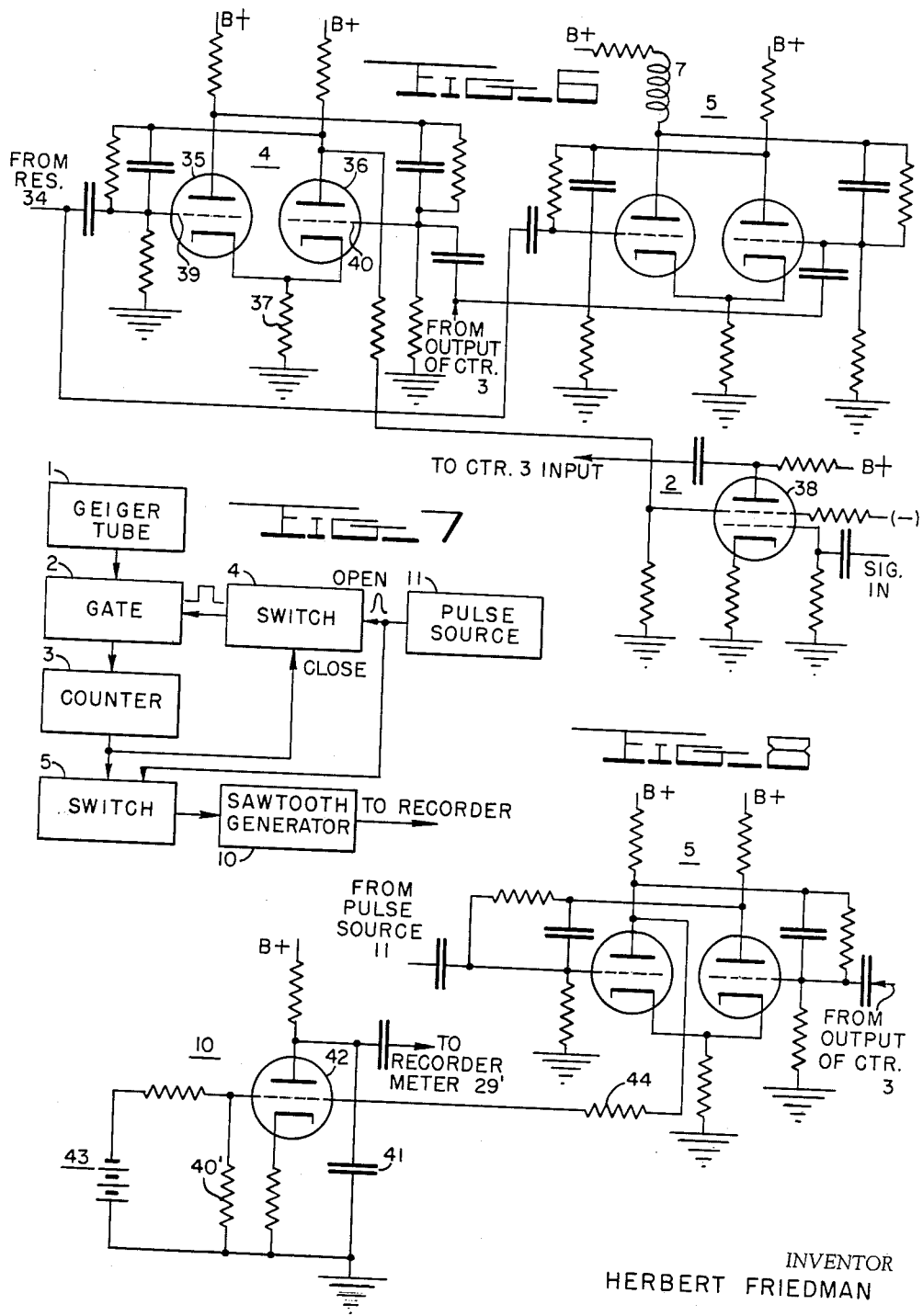

United States Patent Office 2,754,056
Patented July 10, 1956

2,754,056

PULSE RATE COUNTER

Herbert Friedman, Arlington, Va.

Application February 14, 1951, Serial No. 210,902

10 Claims. (Cl. 235—61)

(Granted under Title 35, U. S. Code (1952), sec. 266)

This invention relates to frequency measuring devices. More specifically this invention relates to frequency measuring devices used in measuring the pulse rate output of Geiger-Mueller tubes and the like.

Geiger counters are usually employed in combination with counting circuits which register either the number of counts accumulated in a given time, or with rate meter circuits which present the instantaneous counting rate as a meter deflection. The latter method has the advantage that it can be used with strip chart recording but has the disadvantage of not being practical at low pulse rates. The advantage of the former method is that it is a much more accurate counting rate system but it was not adaptable for use with strip chart recorders. The method of count interval recording described herein combines the desirable features of both the direct counting method and the rate meter strip chart type of recording to provide a simple means of obtaining reciprocal, logarithmic, or other compressed scales to cover a wide range of counting rates.

One aspect of the present invention consists of varying with time the current through a recording meter by means of synchronous motor driven potentiometer. The running time of the motor is controlled by a scaling circuit arranged to automatically stop after a predetermined count. The motor begins to drive the potentiometer at the inception of a counting interval and runs for the duration of the counting interval. When the specified count is reached, the potentiometer is restored rapidly to its zero position. In the zero position a pulse is derived which starts the scaling circuit and initiates a new counting interval.

If the recording meter measures the voltage output of the potentiometer, the envelope of the end points varies inversely as the counting rate. Alternatively, if the meter is inserted in series with the variable resistor element and a constant source of voltage, the envelope of the end points traced will vary directly with the counting rate. Either a linear or a compressed deflection versus time curve is obtained by selecting a linear potentiometer or one with a suitable taper, such as a logarithmically wound potentiometer.

One object of the present invention is to provide a measuring system wherein frequency or rate of a group of pulses can be accurately measured, even at very low frequencies, and at the same time being adaptable for use with strip chart recording devices.

Another object of the present invention is to provide a simple system for obtaining reciprocal, logarithmic, or other compressed scales to cover a wide range of counting rates.

These and other objects of the present invention will become apparent upon making reference to the specification to follow and the drawings wherein:

Fig. 1 is a simplified drawing of one embodiment of the present invention,

Fig. 2 shows the cam and switch arrangement associated with shaft 20' coupled to the synchronous motor of Fig. 1, Fig. 3 is partial showing of another embodiment of the present invention, Fig. 4 shows the waveforms traced by the recording head of the recorder where the deflection thereof is inversely proportional to the frequency or pulse rate to be measured, Fig. 5 shows the waveforms traced by the recording head of the recorder where the deflection thereof is proportional to the frequency or pulse rate to be measured, Figure 6 shows the circuit details of the gate and switch circuits shown in Figure 1, and Figs. 7 and 8 show an alternate embodiment of the present invention.

Referring now to the embodiment of Fig. 1, the output of a Geiger tube 1 is shown coupled to a counter 3 through a gate circuit 2. Gate circuit 2 is controlled by a switch 4 which opens gate 2 at a certain interval allowing the pulses from Geiger tube 1 to be fed to counter 3 to initiate a counting cycle. After a predetermined count has been reached a pulse is produced in the output of counter 3 which closes switch 4, which in turn closes gate 2. The time in which it takes counter 3 to reach its given predetermined count is inversely proportional to the frequency or pulse rate of the pulses at the output of Geiger tube 1. The output of counter 3 is also coupled to a switch 5, which is similar to switch 4. At the beginning of the counting interval, switch 5, like switch 4, is triggered, as later described, into a first switch position until a pulse is fed thereto from counter 3 at the end of the predetermined count interval, which triggers switch 5 back into its initial switch position. Switch 5 controls the energization of a relay 6. Relay 6 remains energized as long as switch 5 is in the first switch position which lasts during the counting interval. The contacts of relay 6 when in a closed position, causes a constant speed motor 16, such as a synchronous clock motor, to be energized. Motor 16, which is energized only during the counting interval of counter 3, controls the movement of a movable contact 23 on a potentiometer 22. The movable contact 23 of potentiometer 22 is always moved from an initial position 23' at one end of potentiometer 22, so that the distance that movable contact 23 moves along potentiometer 22 is directly related to the time in which motor 16 is energized. In other words, the amount of movement of movable contact 23 of potentiometer 22 is directly proportional to the counting interval of counter 3, and this interval in turn, as previously stated, is inversely proportional to the pulse rate of the output of Geiger tube 1 or other suitable pulse source.

Potentiometer 22, by means of switches 25 and 26, is coupled to a direct current voltage source 27 to form two different respective circuit connections depending in which switch position, 1 or 2, switches 25 and 26 are placed. As the movable contact 23 of potentiometer 22 is moved from the initial or zero position 23', the voltage or current appearing at the movable contact 23 is thereby varied. These variations of voltage or current are fed to a recording meter 29' of a conventional recorder 29 where these variations of voltage or current are recorded on the movable recording paper associated with recorder 29. The movement of the recording paper is controlled by a recorder drive motor 28, which is controlled by the contact of relay 6 in a manner which will be hereinafter explained.

To initiate the counting cycle a cam 20 (see Figure 2 also) is connected to a spring bias shaft 20'. When motor 16 is not energized, spring 19 forces shaft 20' to be placed in such a position that cam 20 closes contact 21. Contact 21 completes a circuit comprising a source of direct current 31, a resistance 33 in series therewith, and a switch 31'. Across resistance 33, is a conventional differentiating circuit including condenser 32 and a resistance 34. Upon closing of contacts 21, a pulse is produced across resistance 34 of the differentiating circuit which triggers switches 4 and 5 into a first switch position. Switches 4 and 5 may be a conventional Eccles-Jordan two stability type trigger circuit shown in Fig. 6, the details of which will be later explained.

Because of the fact that spring bias shaft 20' causes contact 21 to be closed when the system is not in operation for some reason, a hand operated spring biased switch 31' is provided so that the circuit including direct source 31 and resistance 33 may be temporarily interrupted to provide a sudden voltage charge which will produce a pulse to initiate a counting cycle in a manner just described.

When switch 4 is triggered into this first switch position, a control voltage is fed therefrom to a gate circuit 2 which opens gate 2, so that the pulses at the output of Geiger tube 1 are coupled to counter 3 which is initially set into a zero count position. Counter 3 may be a conventional electronic binary counter which produces an output pulse after a given predetermined count and sets itself back into a zero count position. (See U. S. Patent 2,422,698 to Miller for the details of such a circuit.)

Relay 6 which is energized during the time which counter 3 is counting from zero to the given predetermined count position, has two sets of contacts, 8—8' and 9—9'. Contacts 8—8', when closed couple an alternating current voltage source 15 to motor 16. Motor 16, is therefore energized during the counting interval of counter 3.

Coupled to the shaft of motor 16 is a step-up gear arrangement 17—18 which in turn is coupled to a spring biased shaft 20'. Spring 19 places shaft 20' into a fixed predetermined position 23' before motor 16 is energized. The position of shaft 20' determines the initial position 23' of the movable contact 23 of potentiometer 22 which contact is coupled to shaft 20'. The energization of motor 16 therefore will cause the movable contact 23 of potentiometer 22 to gradually move from its initial position 23'. As soon as motor 16 becomes deenergized, spring 19 takes control over shaft 20' thus causing the movable contact 23 to return to its initial position 23'. As soon as the movable contact 23 reaches this initial position 23', the cam 20 on shaft 20' closes switch 21. Closure of switch 21 produces a pulse at the output of the differentiating circuit 32—34 by triggering switch 4 into a position which once more opens gate 2, and by triggering switch 5 into a position which causes relay 6 to be energized.

As previously stated, the frequency measured is determined by the period of time in which the movable contact 23 is moved from its initial position 23' and is indicated on recorder 29 by the amount of deflection of the recording head 50 of recorder 29. Thus, referring to Figure 4, showing the waveform recorded by recorder 29 when switches 25 and 26 are in switch position 1, the frequency to be measured is indicated by the distance from the abscissa line a there shown to the envelope line e. The recording paper 51 of recorder 29 is held stationary during the time that the movable contact 23 is moved from its initial position 23'. The recording paper 51 is only moved during the so called fly back time which is the time or period when contact 23 is brought back to its initial position 23' by means of spring 19. Since recorder drive motor 28 moves the paper of recorder 29 during this so called fly back period, switch contacts 9—9' of relay 6, which controls the energization of recorder drive motor 28, are closed when relay 6 is unenergized. Relay contacts 9—9' thus couples the alternating current source 15 to the recorder drive motor 28.

When switches 25 and 26 are in switch position 1, potentiometer 22 is connected directly across a direct voltage source 27. The voltage appearing between the movable contact 23 and the point 23' at the bottom of potentiometer 22 is coupled across the recording meter 29'. The change in voltage occurring between the movable contact 23 and point 23' during a given counting interval is inversely proportional to the frequency being measured.

As is well known in the art, the current flowing through recording meter 29' causes a recording stylus 50 to record a line on a strip of recording paper whose position varies with the current flowing through the recording meter. The instantaneous deflection of the recording head or stylus 50 of recorder 29 is, in other words, proportional to the current flowing through recording meter 29'. When the movable contact 23 of potentiometer 22 is at its initial or bottom position 23', no voltage is coupled to the recording meter 29' and therefore no recording stylus deflection is recorded on the recording paper at that time. The amount of recorded deflection increases as the movable contact moves from point 23' and stops at the end of the counting interval as shown by the waveforms of Fig. 4. The length of the vertical lines of Fig. 4 are thus inversely proportional to the frequency of pulse rate of the output of Geiger tube 1. The diagonal lines shown on Fig. 4 represent the movement of the movable arm 23 of potentiometer 22 back to its initial position at point 23' of potentiometer 22. Because of this inverse relationship between frequency and deflection, switch position 1 producing the waveforms of Fig. 4 is used where the frequencies to be measured are relatively low. In the low frequency region, the amount of deflection change for a given frequency variation is greater resulting in a waveform which is very sensitive to small changes of frequency in the low frequency region assuming that potentiometer 22 is linearly wound.

If potentiometer 22 is non-linearly wound almost any desired relationship between deflection and frequency may be obtained.

Switches 25 and 26 are placed in switch position 2 when relatively high frequencies are to be measured since in this position the waveform gives a more accurate indication of changes of frequency in the high frequency region. In switch position 2, potentiometer 22 is in effect a rheostat which is coupled in series with the direct current voltage source 27 and the recording meter 29' of the recorder 29. In this case the part of potentiometer 22 above the movable contact 23 is removed from the circuit. Thus when movable contact 23 is at its initial position 23', potentiometer 22 contributes no resistance to the circuit in which the recording meter 29' is a part and therefore the current flowing therethrough is a maximum. The waveform registered on the recording paper of this embodiment, is shown in Fig. 5. As the movable contact 20 is moved upward from its initial position 23', the amount of current flowing through the recording meter 29' is thereby decreased. Consequently, as shown in Fig. 5, the line recorded on the recording paper approaches the abscissa line a as the movable contact 23 is moved upward from point 23' of potentiometer 22. In this embodiment the current flowing through the recording meter 29' is inversely proportional to the resistance in the series circuit of which it is a part, and since the value of the resistance which potentiometer 22 contributes is inversely proportional to the frequency of pulses measured, there is a linear relationship between the frequency and the distance from the ordinate line a in Figure 5 and the envelope line e.

It is of course most desirable to reduce the time it takes spring 19 to return the movable contact 23 to its initial position at point 23'. The embodiment of Figure 3 is an improvement over that of Figure 1 in that it reduces the so-called fly back time. The elements shown in Figure 3, take the place of the various elements enclosed within dotted box 32 of Figure 1. In this embodiment synchronous motor 16 is continually energized by alternating current source 15. At the end of the counting interval, spring bias shaft 20' is disengaged from the shaft of the motor 16 by means of a conventional magnetic clutch 30. Energization of magnetic clutch 30 is controlled in the same manner in which the energization of the motor 16 in the embodiment of Fig. 1 was controlled, except that it is energized during the fly back time instead of during the counting interval as was the case of motor 16 in the embodiment of Figure 1. Thus alternating current source 15 is coupled to magnetic clutch 30 by means of contacts 12—12' of a relay 6', which relay is coupled to and controlled by switch 5 in the same manner in which relay 6 in Figure 1 was coupled thereto. When relay 6' is deenergized, which occurs at the end of the counting interval, contacts 12—12' are closed and the output of voltage source 15 is coupled to magnetic clutch 30 which disengages shaft 20' from gears 17 and 18 and from the shaft of motor 16. The magnetic clutch 30 becomes energized when the spring 19 brings shaft 20' into the so-called zero position shown in Figure 2 when cam 20 closes contact 21. When the spring biased shaft 20' is disengaged from motor 16 and gears 18 and 17, the reduced load on spring 19 enables it to bring shaft 20' back to its initial or zero position in a much shorter time than in the embodiment of Figure 1.

Switches 4 and 5 and gate 2 are shown in detail in Figure 6. Switch 4 is a conventional two stability type Eccles-Jordan trigger circuit wherein the conduction of one of the tubes 35 therein renders the other tube 36 nonconductive by means of the voltage developed across a common cathode resistance 37. In a similar manner, conduction of the tube 36 renders the other tube 35 nonconductive. The anodes of tubes 35 and 36 are respectively coupled to the grids of the other tubes 36 and 35 by means of a resistance condenser coupling circuit. If the tube 35 is normally conducting, a positive pulse fed to the grid of the other tube 36 will render that tube conducting which by means of the coupling between the plate of tube 36 and the grid of tube 35 and the voltage drop across the common cathode resistance 37 renders tube 35 nonconductive. In a like manner a positive pulse fed to the grid of tube 35 will render that tube conductive and will render tube 36 nonconductive. Switch 4 controls the conduction of a conventional amplifier stage forming stage 2. Amplifier 2 includes a tube having at least two control grids. The signal to be counted is fed to the grid nearest the cathode of tube 38, and the other grid is coupled to a negative voltage source which normally would render the tube 38 non conductive. Since the output circuit of amplifier or gate tube 38 is coupled to the plate thereof, if the negative voltage supply fed thereto renders tube 38 nonconductive, no signal will appear in the output thereof until the tube 38 is rendered conductive. This last mentioned control grid is also coupled directly to the plate of tube 36 of the switch circuit 4. When tube 36 is conductive the voltage fed to this last mentioned grid is low and insufficient to overcome the effect of the negative cut off bias applied thereto. On the other hand, when tube 36 is rendered nonconductive, the voltage at the plate thereof is of a high positive value which when coupled to the last mentioned grid will overcome the effect of the cut off bias and therefore render tube 38 conductive. The signal fed to the control grid nearest the cathode will then appear in the output thereof.

The control grids of tubes 35 and 36 of switch circuit 4 are respectively coupled to the resistance 34 in the output of counter 3 so that tube 36 is nonconductive, and tube 35 is conductive only during the counting interval.

Switch 5 is identical to switch 4 except that the winding of relay 6 is in the plate circuit 7 of the tube which is conducting during the counting interval so that conduction of this tube will energize the relay 6. When relay 6 is energized then the contacts are moved from one switch position to another in the manner previously described.

If desired, winding 7 of relay 6 may be placed in the plate circuit of tube 35 of switch 4 eliminating the necessity for a separate switch circuit 5. Two separate switch circuits have been shown in the drawings to simplify the explanation by giving each switch circuit only a single function. Also, circuit design consideration may make separate switch circuits desirable.

Although the use of a motor controlled potentiometer 22 is clearly the preferred embodiment of the present invention, the broader aspect of the present invention includes the alternative of utilizing a sawtooth generator as the recording voltage generator instead of the motor controlled potentiometer circuit as shown in Figures 1–3. Figure 7 shows the components needed for this embodiment. (The components which are identical to those of the embodiment of Figures 1–3 have the same reference numbers.)

The embodiment of Figure 7 is similar to that of Figures 1–3 except that a suitable free-running positive pulse generator 11 performs the function of the pulse forming circuit (30 and 31—34) of Figure 1, and switch 5 controls the charging time of a conventional resistance-capacity sawtooth generator circuit 10 instead of a motor controlled potentiometer circuit.

The circuit details of the sawtooth generator circuit and its connection to switch 5 is shown in Figure 8. (The relay winding has of course been omitted from the plate circuit of the left hand tube of switch circuit 5.)

The sawtooth generator circuit 10 is somewhat conventional and it comprises a vacuum tube 42 which is connected across a condenser 41 which forms a charge circuit with a resistance 10 and a direct current voltage source. When tube 42 is non-conductive condenser 41 gradually charges toward the voltage of the direct current voltage source, and when it is conductive it quickly discharges condenser 41. The conduction of tube 42 is normally controlled by a cut-off bias source 43 coupled to the grid thereof, which normally cuts off tube 42. The grid of tube 42 is coupled to the left hand plate of switch 5 which is conducting during the count interval through a resistance 44. The conduction of tube 42 is controlled in a manner similar to that in which tube 38 of gate 2 in Figure 6 is controlled by switch 4 so that tube 42 is non-conductive when the tube with which it is coupled is conducting (during the counting interval) and conductive during the period when this last mentioned tube is non-conductive. It is thus apparent that the amplitude of the sawtooth voltage across condenser 41 increases with the counting interval which decreases with increasing frequency as later explained (as long as condenser 41 is not fully charged before the end of the counting interval).

The embodiment of Figure 8 has the disadvantage that at very low frequency rates condenser 41 must be extremely large to prevent it from fully charging before the end of the counting interval, and also it is not as simple to obtain a linear or other desired relationship between counting interval and voltage variation as is the case with the embodiment of Figures 1–3.

As is apparent to those skilled in the art, electronic counters are generally designed to operate most effectively with sharp or narrow rectangular pulses. The output of Geiger tube 1 consists of sharp pulsations. The electronic counters may also be used for causing the gradual variations of a sinusoidal voltage waveform but for the most satisfactory results the sinusoidal voltage should first be converted to rectangular pulses in any well known or conventional manner.

The term "pulse" as used in the claims is intended to cover voltage waveforms of a sharp rectangular nature as well as flatter, top waves such as a sinusoidal voltage variation.

It should be understood that since the output of Geiger tube 1 consists of pulses at a random rate, that the instant invention gives an indication of the average pulse rate occurring during the counting interval.

Many modifications may be made of the specific embodiments thus far disclosed without deviation from the scope of the present invention.

The invention described herein may be manufactured and used by or for the Government of the United States of America for governmental purposes without the payment of any royalties thereon or therefor.

What is claimed is:

1. A frequency measuring device comprising the combination of a pulse counting means operative to produce a pulse output after a fixed predetermined number of the pulses whose frequency is to be measured have been fed to the input thereof, a gating means coupled to the input of said counting means for receiving the pulses whose frequency is to be measured and for translating said pulses to the input of said counting means, first means coupled to said gating means and to the output of said counting means for rendering said gating means operative to couple pulses to the input of said counting means only until a pulse is fed to said first means from the output of said counting means, saw-tooth voltage generating means coupled to said counting means responsive to signals derived therefrom at the beginning and end of the counting interval thereof to generate a continuously varying voltage wave during the counting interval, and peak signal indicator means operative to indicate the peak magnitude of the voltage generated by said saw-tooth voltage generator means.

2. A frequency measuring device comprising the combination of a pulse counting means operative to produce a pulse output after a given predetermined number of pulses have been fed to the input thereof, a gating means coupled to the input of said counting means, first means coupled to said gating means and to the output of said counting means for rendering said gating means operative to couple a voltage fed to the input thereof to the input of said counting means only until a pulse is fed to said first means from the output of said counting means, second means coupling the pulses whose frequency is to be measured to the input of said gating means, saw-tooth voltage generating means coupled to said counting means responsive to signals derived therefrom at the beginning and end of the counting interval thereof to generate a continuously varying voltage wave during the counting interval, and peak signal indicator means operative to indicate the peak magnitude of the voltage generated by said saw-tooth voltage generator means.

3. A frequency measuring device comprising the combination of a pulse counting means operative to produce a pulse output after a fixed predetermined number of pulses have been fed to the input thereof and to return to an initial reference count position, first means for gating the pulses whose frequency is to be measured to the input of said pulse counting means, first trigger circuit means responsive to the pulse output of said counting means to render said first means inoperative to couple said pulses to the input of said counting means after a given fixed predetermined number of pulses have been fed thereto, a second trigger circuit means operative at the beginning of each counting interval and responsive to the pulse output of said pulse counting means at the end of said counting interval to energize a relay including movable contacts only for the duration of the counting intervals, a variable voltage source including a variable impedance element therein for varying the output thereof, a constant speed motor coupled to said variable impedance element through a spring biased shaft for varying same, a source of energizing voltage, means coupling said motor and said energizing voltage source through the contacts of said relay so that said motor is energized simultaneously with the energization of said relay, said spring biased shaft returning itself to a fixed position when said motor is unenergized, means including a cam and switch arrangement coupled to said spring biased shaft for initiating a pulse when said spring biased shaft returns to said fixed position for triggering said first trigger circuit in a condition to render said first means operative to couple the pulses whose frequency is to be measured to said counting means and to trigger said second trigger circuit to energize said relay at the beginning of said counting intervals, means coupled to the output of said variable voltage source for indicating the value of the output thereof.

4. A frequency measuring device comprising the combination of a pulse counting means operative to produce a pulse output after a fixed predetermined number of pulses have been fed to the input thereof and to return to an initial reference count position, first means for gating the pulses whose frequency is to be measured to the input of said pulse counting means, first trigger circuit means responsive to the pulse output of said counting means to render said first means inoperative to couple said pulses to the input of said counting means after a given fixed predetermined number of pulses have been fed thereto, a second trigger circuit means operative at the beginning of each counting interval and responsive to the pulse output of said pulse counting means at the end of said counting interval to energize a relay including movable contacts only for the duration of the counting intervals, a variable voltage source including a variable impedance element therein for varying the output thereof, a constant speed motor coupled to said variable impedance element through a magnetic clutch means and a spring biased shaft in the order named, an energizing voltage source, means coupling the contacts of said relay and said energizing voltage source to said magnetic clutch means whereby said magnetic clutch disengages said motor from said variable impedance element during the period when said relay is un-energized, said spring biased shaft returning to a fixed position when said motor is decoupled therefrom, means including a cam and switch arrangement coupled to said spring biased shaft for initiating a pulse when said spring biased shaft returns to said fixed position for triggering said first trigger circuit in a condition to render said first means operative to couple the pulses to be measured to said counting means and to trigger said second trigger circuit to energize said relay at the beginning of said counting intervals, means coupled to the output of said variable voltage source for indicating the value of the output thereof.

5. A frequency measuring device comprising the combination of a pulse counting means operative to reset itself to an initial reference count position after a given number of pulses have been counted thereby, first means coupled to the input of said counting means for receiving the pulses whose frequency is to be measured and for translating said pulses to the input of said counting means, second means for rendering said first means operative to couple the pulses to said counting means, means coupling said counting means to said first means and responsive to an output indication of said counting means when a predetermined number of pulses have been counted thereby to render said first means inoperative to couple the pulses whose frequency is to be measured to the counting means, saw-tooth voltage generating means comprising a motor driven potentiometer responsive to the count registered in said counting means for generating a voltage which gradually changes in magnitude from a fixed voltage level at the beginning of the counting interval of said counting means until a given predetermined count is registered therein when said generated voltage quickly returns to the initial level, peak voltage indicating means operative to indicate the peak voltages achieved by said generated voltage, and means actuated by said generating means operative to initiate a new counting interval when said generated voltage returns to said initial level.

6. A frequency measuring device comprising the combination of a pulse counting means operative to reset itself to an initial reference count position after a given predetermined pulse count has been registered therein, a variable voltage source including a variable impedance element therein for varying the output thereof, gating means coupling the pulses whose frequency is to be measured to the input of said pulse counting means, means coupled between said variable impedance element and said pulse counting means for varying said impedance element from a fixed value at the inception of a counting interval until a given predetermined number of pulses have been counted by said counting means, means for returning said impedance element to said fixed value at the end of each counting interval before the inception of the next pulse counting interval, means coupled to the output of said voltage source for measuring the output thereof whereby a measure of the frequency of said pulses is obtained, switch means coupled to said counting means responsive to the output pulse thereof to disable said gating means, and further means responsive to said output pulse to thereafter control said switch means to re-energize said gating means and re-couple the input pulses to the counter.

7. A frequency measuring device comprising the combination of a pulse counting means operative to reset itself to an initial reference count position after a given predetermined pulse count has been registered therein, a variable voltage source including a variable impedance element therein for varying the output thereof, gating means coupling the pulses whose frequency is to be measured to the input of said pulse counting means, means coupled between said variable impedance element and said pulse counting means for varying said impedance element from a fixed value at the inception of a counting interval until a given predetermined number of pulses have been counted by said counting means, means for returning said impedance element to said fixed value at the end of each counting interval before the inception of the next pulse counting interval, a strip chart recorder including a strip of movable recording paper and means for recording an indication thereon proportional to the voltage at the output of said variable voltage source, means for moving said recording paper only during the period between counting intervals, switch means coupled to said counting means responsive to the output pulse thereof to disable said gating means, and further means responsive to said output pulse to thereafter control said switch means to re-energize said gating means and re-couple the input pulses to the counter.

8. A frequency measuring device comprising the combination of a pulse counting means operative to produce an output signal and to reset itself to an initial reference count position after a given number of pulses have been counted thereby, gating means normally coupling the pulses whose frequency is to be measured to the input of said counting means, first switch means coupled to the output of said counting means and responsive to an output from said counting means when said given number of pulses have been counted to render said gating means inoperative to couple pulses to said counting means, indicator means coupled to said counting means operative to give an indication of the duration of the counting interval of said counting means, said first switch means being further coupled to said indicator means and actuated thereby to again render said gating means operative to couple pulses to said counting means, and means responsive to the output of said counting means operable to actuate said indicator means only during said counting interval.

9. A frequency measuring device comprising the combination of a pulse counting means operative to produce an output signal and to reset itself to an initial reference count position after a given number of pulses have been counted thereby, gating means normally coupling the pulses whose frequency is to be measured to the input of said counting means, switch means coupled to the output of said counting means and responsive to an output from said counting means when said given number of pulses have been counted to render said gating means inoperative to couple pulses to said counting means, indicator means coupled to said counting means operative to give an indication of the duration of the counting interval of said counting means, means coupled to said switch means and operative such that said switch means will again render said gating means operative to couple pulses to said counting means, and means responsive to the output of said counting means operable to actuate said indicator means only during said counting interval.

10. The frequency measuring device of claim 9 wherein said indicator means comprises an electronic sawtooth voltage generating means responsive to signals derived from said counting means generating a continuously varying voltage wave during the counting interval, and peak signal indicator means operative to indicate the peak magnitude of the voltage generated by said sawtooth voltage generator means.

References Cited in the file of this patent
UNITED STATES PATENTS

| | | |
|---|---|---|
| 2,414,107 | Kenyon | Jan. 14, 1947 |
| 2,516,189 | Dinsmore | July 25, 1950 |
| 2,519,184 | Grosdoff | Aug. 15, 1950 |
| 2,521,789 | Grosdoff | Sept. 12, 1950 |
| 2,537,427 | Seid | Jan. 9, 1951 |
| 2,539,623 | Heising | Jan. 30, 1951 |
| 2,563,102 | Crosman | Aug. 7, 1951 |
| 2,566,078 | Bliss | Aug. 28, 1951 |
| 2,568,724 | Earp | Sept. 25, 1951 |
| 2,576,900 | Brockman | Nov. 27, 1951 |
| 2,625,656 | Blackmore | Jan. 13, 1953 |